(12) United States Patent
Ebrahimi Afrouzi

(10) Patent No.: US 12,079,007 B1
(45) Date of Patent: Sep. 3, 2024

(54) AUTONOMOUS REFUSE BAG REPLACEMENT SYSTEM

(71) Applicant: Ali Ebrahimi Afrouzi, San Diego, CA (US)

(72) Inventor: Ali Ebrahimi Afrouzi, San Diego, CA (US)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 17/470,915

(22) Filed: Sep. 9, 2021

Related U.S. Application Data

(63) Continuation of application No. 16/261,635, filed on Jan. 30, 2019, now Pat. No. 11,144,066.

(60) Provisional application No. 62/624,525, filed on Jan. 31, 2018.

(51) Int. Cl.
  *G05D 1/00* (2024.01)
  *B65F 1/06* (2006.01)
  *B65F 1/12* (2006.01)

(52) U.S. Cl.
  CPC .............. *G05D 1/0287* (2013.01); *B65F 1/06* (2013.01); *B65F 1/12* (2013.01); *G05D 1/0212* (2013.01); *B65F 2210/128* (2013.01); *B65F 2210/1443* (2013.01); *B65F 2210/165* (2013.01); *B65F 2210/168* (2013.01)

(58) Field of Classification Search
  CPC .............. G05D 1/0287; G05D 1/0212; G05D 2201/0203; B65F 1/06; B65F 1/12; B65F 2210/128; B65F 2210/1443; B65F 2210/165; B65F 2210/168

See application file for complete search history.

(56) References Cited

U.S. PATENT DOCUMENTS

| | | |
|---|---|---|
| 4,537,420 A | 8/1985 | Ito |
| 5,323,483 A * | 6/1994 | Baeg .................. G01F 1/74 388/811 |
| 5,565,846 A | 10/1996 | Geiszler |
| 5,697,633 A | 12/1997 | Lee |
| 5,924,712 A | 7/1999 | Pierce |
| 5,946,770 A | 9/1999 | Bijma |
| 5,995,884 A | 11/1999 | Allen |
| 6,535,793 B2 | 3/2003 | Allard |
| 6,667,592 B2 | 12/2003 | Jacobs |
| 6,845,297 B2 | 1/2005 | Allard |

(Continued)

FOREIGN PATENT DOCUMENTS

| | | |
|---|---|---|
| CN | 104944029 A  * | 9/2015 |
| CN | 104944029 B | 6/2017 |
| JP | 4556024 B2 * | 10/2010 |

*Primary Examiner* — Yazan A Soofi
*Assistant Examiner* — Naeem Taslim Alam

(57) ABSTRACT

Provided is a robotic refuse container, including a chassis; a set of wheels coupled to the chassis; a refuse container coupled to the chassis for collecting refuse; a rechargeable battery; a plurality of sensors; a processor; and a tangible, non-transitory, machine-readable medium storing instructions that when executed by the processor effectuates operations including: detecting, with at least one sensor disposed on the robotic refuse container, an amount of refuse within the refuse container; instructing, with the processor, the robotic refuse container to navigate to a location to empty the refuse upon detecting the amount of refuse exceeds a predetermined refuse amount in the refuse container; and emptying, by a separate device, the refuse within the refuse container at the location.

18 Claims, 6 Drawing Sheets

(56) References Cited

U.S. PATENT DOCUMENTS

| | | | |
|---|---|---|---|
| 7,406,402 B1* | 7/2008 | Waitkus, Jr. | G06Q 10/08 |
| | | | 702/188 |
| 7,568,536 B2 | 8/2009 | Yu | |
| 7,813,835 B2 | 10/2010 | Fujita | |
| 8,355,828 B2 | 1/2013 | Tolia | |
| 8,380,349 B1 | 2/2013 | Hickman | |
| 9,168,786 B2 | 10/2015 | Schlee | |
| 9,283,674 B2 | 3/2016 | Hoffman | |
| 9,298,183 B2 | 3/2016 | Artes | |
| 9,486,924 B2 | 11/2016 | Dubrovsky | |
| 2005/0281653 A1* | 12/2005 | Channel | B62B 5/0026 |
| | | | 414/498 |
| 2009/0044370 A1 | 2/2009 | Won | |
| 2012/0011676 A1 | 1/2012 | Jung | |
| 2012/0291809 A1 | 11/2012 | Kuhe | |
| 2015/0307273 A1 | 10/2015 | Lyman | |
| 2016/0071396 A1* | 3/2016 | Call | G08B 25/004 |
| | | | 340/686.6 |
| 2016/0121487 A1* | 5/2016 | Mohan | B25J 9/0084 |
| | | | 700/250 |
| 2016/0166126 A1* | 6/2016 | Morin | A47L 9/281 |
| | | | 15/319 |
| 2016/0183752 A1* | 6/2016 | Morin | A47L 9/1625 |
| | | | 15/340.1 |
| 2016/0379468 A1 | 12/2016 | Wu | |
| 2017/0043966 A1 | 2/2017 | Witelson | |
| 2018/0116478 A1* | 5/2018 | Lewis | A47L 9/009 |
| 2018/0164828 A1 | 6/2018 | Dumitras | |
| 2018/0192845 A1* | 7/2018 | Gu | G05D 1/0227 |
| 2018/0286250 A1* | 10/2018 | Cronin | G06Q 50/12 |
| 2018/0305948 A1 | 10/2018 | Lection | |
| 2018/0329617 A1* | 11/2018 | Jones | G05D 1/0246 |
| 2018/0344116 A1* | 12/2018 | Schriesheim | A47L 9/2857 |
| 2019/0200826 A1* | 7/2019 | Burbank | A47L 9/1409 |
| 2020/0069139 A1* | 3/2020 | Johnson | G05D 1/227 |
| 2020/0387165 A1* | 12/2020 | Wang | A47L 5/30 |
| 2021/0283773 A1* | 9/2021 | Ahn | A47L 9/2857 |

* cited by examiner

AUTONOMOUS REFUSE BAG REPLACEMENT SYSTEM

CROSS-REFERENCE TO RELATED APPLICATIONS

This application is Continuation U.S. Non-Provisional patent application Ser. No. 16/261,635, filed Jan. 30, 2019, which claims the benefit of U.S. Provisional Patent Application No. 62/624,525, filed Jan. 31, 2018, each of which is hereby incorporated by reference.

In this patent, certain U.S. patents, U.S. patent applications, or other materials (e.g., articles) have been incorporated by reference. Specifically, U.S. application Ser. Nos. 15/272,752, 15/949,708, 16/048,179, 16/048,185, 16/163,541, 16/163,562, 16/163,508, 16/185,000, 62/681,965, 62/614,449, 16/109,617, 16/051,328, 15/449,660, 16/041,286, 15/406,890, 14/673,633, 16/163,530, 62/746,688, 62/740,573, 62/740,580, 15/955,480, 15/425,130, 15/955,344, 15/048,827, 14/817,952, 16/198,393, 15/981,643, 15/986,670, 62/664,389, 15/447,450, 15/447,623, 62/665,942, 62/617,589, 62/620,352, 15/951,096, 16/130,880, 14/948,620, 16/239,410, 14/859,748, 16/230,805, 16/245,998 and 16/129,757, are hereby incorporated by reference. The text of such U.S. Patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

This disclosure relates to refuse bags and more particularly to autonomous refuse bag replacement.

BACKGROUND

Autonomous robotic devices are becoming increasingly common in consumer homes and industrial spaces. In several instances, autonomous robotic devices are desirable for the convenience they provide to a user. For example, autonomous robotic devices may be used for cleaning, managing waste, packaging items, manufacturing items, transportation, and security. However, in some cases, only a portion of a task is automated by robotic devices and human intervention is still required to complete the entire task. For example, a robotic vacuum can autonomously vacuum an area, however, human intervention is required to empty the dustbin. In another example, a robotic device can autonomously extrude an object, however, human intervention is required to refill the material from which the object is manufactured from. An autonomous robotic device that can automate all portions of a task from beginning to end can be beneficial.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Provided is a robotic refuse container, including a chassis; a set of wheels coupled to the chassis; a refuse container coupled to the chassis for collecting refuse; a rechargeable battery; a plurality of sensors; a processor; and a tangible, non-transitory, machine-readable medium storing instructions that when executed by the processor effectuates operations including: detecting, with at least one sensor disposed on the robotic refuse container, an amount of refuse within the refuse container; instructing, with the processor, the robotic refuse container to navigate to a location to empty the refuse upon detecting the amount of refuse exceeds a predetermined refuse amount in the refuse container; and emptying, by a separate device, the refuse within the refuse container at the location.

Provided is a robotic refuse container, including: a chassis; a set of wheels coupled to the chassis; a refuse container coupled to the chassis for collecting refuse; a rechargeable battery; a plurality of sensors; a processor; and a tangible, non-transitory, machine-readable medium storing instructions that when executed by the processor effectuates operations including: receiving, with the processor, an instruction to navigate the robotic refuse container to a location to empty the refuse within the refuse container; instructing, with the processor, the robotic refuse container to navigate to the location to empty the refuse; navigating, with the robotic refuse container, to the location; and emptying, by a separate device, the refuse within the refuse container at the location.

DETAILED DESCRIPTION OF SOME EMBODIMENTS

Figure 1:
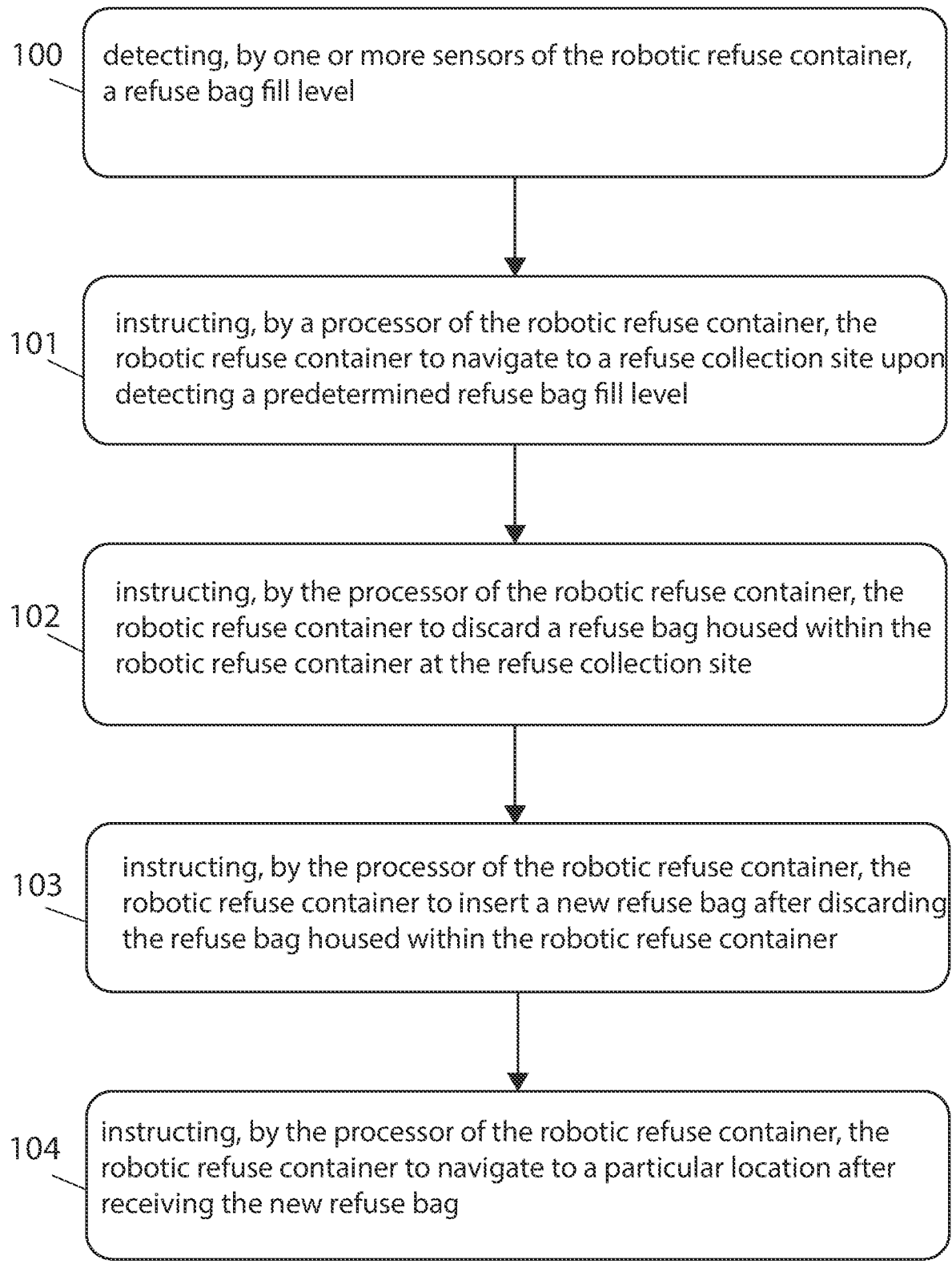
FIG. 1 illustrates a flow chart describing a refuse bag replacement method according to some embodiments.

The present inventions will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some aspects include an autonomous robotic refuse bag replacement system for a robotic refuse container including: detecting, by one or more sensors of the robotic refuse container, a refuse bag fill level; instructing, by a processor of the robotic refuse container, the robotic refuse container to navigate to a refuse collection site upon detecting a predetermined refuse bag fill level; and instructing, by the processor of the robotic refuse container, the robotic refuse container to discard a refuse bag housed within the robotic refuse container at the refuse collection site. In some embodiments, the robotic refuse container navigates to a nearest refuse collection site or the collection site that can be reached the fastest from the current location of the robotic refuse container. In some embodiments, the robotic refuse bag replacement system further includes instructing, by the processor of the robotic refuse container, the robotic refuse container to insert a new refuse bag. In some embodiments, the robotic refuse container obtains the new refuse bag from a storage location housed within the robotic refuse container. In some embodiments, the robotic refuse container obtains the new refuse bag from a location external to the robotic refuse container. In some embodiments, the robotic refuse bag replacement system further includes transmitting, by the processor of the robotic refuse container, a request for a new refuse bag to a processor of a refuse bag replacement robot; and instructing, by the processor of the refuse bag replacement robot, the refuse bag replacement robot to insert a new refuse bag within the robotic refuse container when positioned adjacent to the robotic refuse container. In some embodiments, the refuse bag replacement robot that receives the request for a new refuse bag is a nearest refuse bag replacement robot or can reach the robotic refuse container the fastest. In some embodiments, the processor of the robotic refuse container instructs the robotic refuse container to navigate to the refuse bag replacement robot prior to transmitting a request for the new refuse bag. In some embodiments, the processor of the refuse bag replacement robot instructs the refuse bag replacement robot to navigate to the robotic refuse container after receiving the request for the new refuse bag. In some embodiments, the robotic refuse container navigates to a particular location after insertion of a new refuse bag or remains in the same location.

Some aspects include an autonomous robotic refuse bag replacement system for a robotic refuse container including: detecting, by one or more sensors of the robotic refuse container, a refuse bag fill level; and transmitting, by a processor of the robotic refuse container, a request for refuse bag collection to a processor of a robotic refuse bag collection robot upon detecting a predetermined refuse bag fill level. In some embodiments, the refuse bag collection robot that receives the request for refuse bag collection is a nearest refuse bag collection robot or that can reach the robotic refuse container the fastest. In some embodiments, the autonomous robotic refuse bag replacement system further includes instructing, by the processor of the robotic refuse bag collection robot, the refuse bag collection robot to collect the refuse bag within a refuse container of the robotic refuse container upon receiving the request for refuse bag collection. In some embodiments, the autonomous robotic refuse bag replacement system further includes transmitting, by the processor of the robotic refuse container, a request for a new refuse bag to the processor of the refuse bag collection robot; and instructing, by the processor of the refuse bag collection robot, the refuse bag collection robot to insert a new refuse bag within the refuse container. In some embodiments, the robotic refuse bag replacement system further includes instructing, by the processor of the robotic refuse container, the robotic refuse container to insert a new refuse bag. In some embodiments, the robotic refuse container obtains the new refuse bag from a storage location housed within the robotic refuse container. In some embodiments, the robotic refuse container obtains the new refuse bag from a location external to the robotic refuse container. In some embodiments, the robotic refuse bag replacement system further includes transmitting, by the processor of the robotic refuse container, a request for a new refuse bag to a processor of a refuse bag replacement robot; and instructing, by the processor of the refuse bag replacement robot, the refuse bag replacement robot to insert a new refuse bag within the robotic refuse container when positioned adjacent to the robotic refuse container. In some embodiments, the refuse bag replacement robot that receives the request for a new refuse bag is a nearest refuse bag replacement robot or can reach the robotic refuse container the fastest. In some embodiments, the processor of the robotic refuse container instructs the robotic refuse container to navigate to the refuse bag replacement robot prior to transmitting a request for the new refuse bag. In some embodiments, the processor of the refuse bag replacement robot instructs the refuse bag replacement robot to navigate to the robotic refuse container after receiving the request for the new refuse bag. In some embodiments, the robotic refuse container navigates to a particular location after insertion of a new refuse bag or remains in the same location.

In some embodiments, a control system manages the autonomous robotic refuse bag replacement system for a robotic refuse container. An example of a control system for managing robotic devices is described in U.S. patent application Ser. Nos. 16/130,880 and 16/230,805, the entire contents of which is hereby incorporated by reference. In some embodiments, the robotic refuse container is paired with the control system using a pairing method such as that described in U.S. patent application Ser. No. 16/109,617, the entire contents of which is hereby incorporated by reference. In some embodiments, the control system includes, a centralized server, a specialized computing device, an application (mobile or web for example) accessible from a communication device such as a mobile phone, tablet, laptop, etc., or another type of device. In some embodiments, the control system is autonomous, semi-autonomous, or manually operated. In some embodiments, the robotic refuse container communicates information with the control system, such as, a current volume of refuse, a maximum volume of refuse, a battery level, a current location, etc. and the control system instructs the robotic refuse container based on the information from the robotic refuse container communicated with the control system.

Some aspects include an autonomous robotic refuse bag replacement system for a robotic refuse container including: detecting, by one or more sensors of the robotic refuse container, a refuse bag fill level; and transmitting, by a processor of the robotic refuse container, a request for refuse bag collection to a control system managing the robotic refuse container upon detecting a predetermined refuse bag fill level. In some embodiments, the autonomous robotic refuse bag replacement system further includes transmitting, by the control system, a refuse collection site and a navigation path thereto to the processor of the robotic refuse container and instructing, by the processor of the robotic refuse container, the robotic refuse container to navigate to the collection site. In some embodiments, the collection site is the nearest collection site or the collection site that can be reached the fastest from a current location of the robotic refuse container. In some embodiments, the autonomous robotic refuse bag replacement system further includes instructing, by the processor of the robotic refuse container, the robotic refuse container to discard a refuse bag housed within the robotic refuse container at the refuse collection site. In some embodiments, the robotic refuse bag replacement system further includes instructing, by the processor of the robotic refuse container, the robotic refuse container to insert a new refuse bag. In some embodiments, the robotic refuse container obtains the new refuse bag from a storage location housed within the robotic refuse container. In some embodiments, the robotic refuse container obtains the new refuse bag from a location external to the robotic refuse container. In some embodiments, the robotic refuse bag replacement system further includes transmitting, by the control system, a refuse bag storage location to the processor of the robotic refuse container and instructing, by the processor of the robotic refuse container, the robotic refuse container to navigate to the refuse bag storage location. In some embodiments, the refuse bag storage location is the nearest refuse bag storage location or the refuse bag storage location that can be reached the fastest from a current location of the robotic refuse container. In some embodiments, the robotic refuse bag replacement system further includes transmitting, by the processor of the robotic refuse container, a request for a new refuse bag to the control system; and instructing, by the control system, a refuse bag replacement robot to insert a new refuse bag within the robotic refuse container when positioned adjacent to the robotic refuse container. In some embodiments, the refuse bag replacement robot that receives the request for a new refuse bag is a nearest refuse bag replacement robot or can reach the robotic refuse container the fastest. In some embodiments, the control system instructs the robotic refuse container to navigate to the refuse bag replacement robot after receiving a request for the new refuse bag. In some embodiments, the control system instructs the refuse bag replacement robot to navigate to the robotic refuse container after receiving the request for the new refuse bag. In some embodiments, the refuse bag replacement robot is the nearest refuse bag replacement robot or the refuse bag replacement robot that can be accessed the fastest based on a current location of the robotic refuse container. In some embodiments, the control system instructs the robotic refuse container to navigate to a particular location after insertion of a new refuse bag or remains in the same location.

Some aspects include an autonomous robotic refuse bag replacement system for a robotic refuse container including: detecting, by one or more sensors of the robotic refuse container, a refuse bag fill level; transmitting, by a processor of the robotic refuse container, a request for refuse bag collection to a control system paired with the robotic refuse container upon detecting a predetermined refuse bag fill level and transmitting, by the control system, a request for refuse bag collection from the robotic refuse container to a processor of a refuse bag collection robot. In some embodiments, the refuse bag collection robot that receives the request for refuse bag collection is a nearest refuse bag collection robot or can reach the robotic refuse container the fastest. In some embodiments, the autonomous robotic refuse bag replacement system further includes instructing, by the processor of the robotic refuse bag collection robot, the refuse bag collection robot to collect the refuse bag within a refuse container of the robotic refuse container upon receiving the request for refuse bag collection. In some embodiments, the autonomous robotic refuse bag replacement system further includes transmitting, by the processor of the robotic refuse container, a request for a new refuse bag to the control system; and transmitting, by the control system, a request for a new refuse bag for the refuse bag container to the processor of the refuse bag collection robot and instructing, by the processor of the refuse bag collection robot, the refuse bag collection robot to insert a new refuse bag within the refuse container. In some embodiments, the robotic refuse bag replacement system further includes instructing, by the processor of the robotic refuse container, the robotic refuse container to insert a new refuse bag. In some embodiments, the robotic refuse container obtains the new refuse bag from a storage location housed within the robotic refuse container. In some embodiments, the robotic refuse container obtains the new refuse bag from a location external to the robotic refuse container. In some embodiments, the robotic refuse bag replacement system further includes transmitting, by the control system, a request for a new refuse bag for the robotic refuse container to a processor of a refuse bag replacement robot; and instructing, by the processor of the refuse bag replacement robot, the refuse bag replacement robot to insert a new refuse bag within the refuse container when positioned adjacent to the robotic refuse container. In some embodiments, the refuse bag replacement robot that receives the request for a new refuse bag is a nearest refuse bag replacement robot or can reach the robotic refuse container the fastest. In some embodiments, the control system instructs the refuse bag replacement robot to navigate to a robotic refuse container after receiving the request for the new refuse bag. In some embodiments, the refuse bag replacement robot is a nearest refuse bag replacement robot or can be reached the fastest. In some embodiments, the control system instructs the robotic refuse container to navigate to a particular location after insertion of a new refuse bag or remain in the same location. In some embodiments, the control system transmits information including the closest location to recharge a battery, the closest refuse collection location, and a navigational route to the processor of the robotic refuse container.

In some embodiments, an environment includes multiple robotic refuse containers, refuse bag collection robots, refuse bag storage locations, and refuse bag replacement robots. In some embodiments, robotic devices autonomously park in a designated parking area when unused. An example of a method for autonomous parking of robotic devices is described in U.S. patent application Ser. No. 16/230,805, the entire contents of which is hereby incorporated by reference. In some embodiments, the robotic devices are operated using the autonomous vehicle system and methods described in U.S. patent application Ser. No. 16/230,805, the entire contents of which are hereby incorporated by reference.

In some embodiments, the processor of one or more of the robotic device or a control system managing the robotic devices determines one or more of: a refuse collection site for a robotic refuse container to remove a refuse bag, a navigation path of a robotic refuse container to a refuse collection site, a refuse bag collection robot to collect a refuse bag from a robotic refuse container, a navigation path of a robotic refuse container to a refuse bag collection robot, a navigation path of a refuse bag collection robot to a robotic refuse container, a refuse bag replacement robot to insert a new refuse bag within a robotic refuse container, a navigation path of a robotic refuse container to a refuse bag replacement robot, a navigation path of a refuse bag replacement robot to a robotic refuse container. In some embodiments, such decisions are determined based on various factors (e.g., an amount of time required to replace a refuse bag, traffic, battery level of robotic devices, etc.) and what is most beneficial for the entire environment (e.g., for a Markov Decision Process, the actions that result in a maximum reward). Examples describing the implementation of a MDP are provided in U.S. patent application Ser. Nos. 15/981,643, 16/185,000, 16/230,805, 14/817,952, and 16/198,393 the entire contents of which are hereby incorporated by reference. In some embodiments, robotic devices of the same type or different type collaborate and share intelligence to make such decisions using methods such as those described in U.S. patent application Ser. Nos. 15/981,643, 15/986,670, 16/185,000, 15/048,827 and 14/948,620, the entire contents of which are hereby incorporated by reference. In some embodiments, robotic refuse containers collaborate such that an idle robotic refuse container replaces the position of a robotic refuse container during removal of a refuse bag at a refuse collection site or during a battery charge. An example of a robotic refuse container replacement system is described in U.S. patent application Ser. No. 16/245,998, the entire contents of which is hereby incorporated by reference.

Examples of different factors that can be considered in making decisions such as those described above include a surrounding activity level, a number of operation hours, a condition, a status, historical success in completing actions, actions executed, upcoming actions, sensor data collected and a number of maintenance hours of any robotic devices (such as those described herein, i.e., robotic refuse container, refuse bag collection robot, refuse bag replacement robot, and robotic refuse compressor). Factors can further include a time required for refuse bag replacement and environmental conditions (e.g., traffic conditions, weather conditions, etc.). In some embodiments, the processor of the robotic refuse container or a control system managing the robotic refuse container autonomously adjusts operational settings or chooses actions of the robotic refuse container at least partially based on environmental characteristics observed using methods such as those described in U.S. patent application Ser. Nos. 16/239,410 and 16/163,530, the entire contents of which are hereby incorporated by reference.

In some embodiments, the processor of the robotic refuse container determines decisions, processes, execution of tasks individually based on, for example, internal and/or external observations, information received from the control system and/or other robotic devices, historical information, etc. In some embodiments, the processor of the robotic refuse container uses machine learning techniques to independently determine optimal actions to execute. Examples of learning techniques that can be applied are described in U.S. patent application Ser. Nos. 16/230,805, 14/859,748, 16/239,410, 16/041,286, and 16/198,393, the entire contents of which are hereby incorporated by reference. In some embodiments, the control system determines decisions, processes, execution of tasks for individual robotic refuse containers to which it is connected to.

In some embodiments, the one or more sensors of the robotic refuse container include at least one of: a weight sensor and a refuse bag volume sensor. In some embodiments, the refuse bag volume sensor includes an infrared (IR) transmitter and receiver positioned across from one another on a first and a second wall of a refuse container of the robotic refuse container and at a height at which refuse bag replacement is required. In some embodiments, the IR transmitter transmits a signal received by the IR receiver when the refuse within the refuse container is at a height below the height of the IR transmitter and receiver. In some embodiments, the refuse within the refuse container blocks the IR receiver from receiving the signal transmitted by the IR transmitter when the refuse within the refuse container is at a height equal to or greater than the height of the IR transmitter and receiver. In some embodiments, the processor of the robotic refuse container instructs the robotic refuse container to navigate to the refuse collection site when the IR receiver does not receive the IR signal transmitted by the IR transmitter for a predetermined amount of time. In some embodiments, other types of sensors that can detect refuse bag fill level are used.

In some embodiments, the robotic refuse container further includes a refuse compressor that compresses the refuse within the refuse bag such that the refuse bag volume is reduced. In some embodiments, the refuse compressor includes a plate connected to an arm. In some embodiments, the arm moves the plate to push it down on the refuse within the refuse container to reduce the refuse bag volume. In some embodiments, the robotic refuse container navigates to a robotic refuse compressor and the processor of the robotic refuse container transmits a request to a processor of the of the robotic refuse container to compress the refuse within the container of the robotic refuse container. In some embodiments, refuse compression can only be executed a predetermined number of times.

In some embodiments, one or more of the different robotic devices (i.e., robotic refuse container, refuse bag collection robot, refuse bag replacement robot, and robotic refuse compressor) include one or more robotic arms for, for example, collecting a refuse bag, inserting a refuse bag, tying a refuse bag, etc.

In some embodiments, one or more of the different robotic devices (i.e., robotic refuse container, refuse bag collection robot, refuse bag replacement robot, and robotic refuse compressor) are static. In some embodiments, the refuse container is static and a refuse bag collection robot and refuse bag replacement robot navigates to the static refuse container to collect a refuse bag housed within the refuse container and insert a new refuse bag. In some embodiments, the refuse bag collection robot and the refuse bag replacement robot are scheduled to pick up and replace one or more refuse bags of one or more refuse containers. In some embodiments, the refuse bag collection robot and refuse bag replacement robot are the same robot. In some embodiments, one or more of the different robotic devices (i.e., robotic refuse container, refuse bag collection robot, refuse bag replacement robot, and robotic refuse compressor) are mobile.

In embodiments, a graphical user interface of an application of a communication device is used to communicate with the robotic refuse containers or a control system managing the robotic refuse container. An example of a communication device includes, a mobile phone, a laptop, a tablet, a desktop computer, a remote control, and the like. An example of a graphical user interface is described in U.S. patent application Ser. Nos. 15/272,752 and 15/949,708, the entire contents of which are hereby incorporated by reference. In some embodiments, the application of the communication device is paired with the robotic refuse container or the control system managing the robotic refuse container using pairing methods such as those described in U.S. patent application Ser. No. 16/109,617, the entire contents of which is hereby incorporated by reference. Information communicated between the application of the communication device and the robotic refuse container, the control system managing the robotic refuse container or any other robotic device (such as those described herein) can include, but is not limited to, request for refuse bag collection, request for a new refuse bag, fill level of a refuse container, battery level of a robotic refuse container or any other robotic device, request to navigate to a particular location, a current location, etc. In some embodiments, a user communicates with the control system in real time using the application of the communication device, and the control system provides instructions to at least one of the robotic devices based on the information communicated from the application. In some embodiments, the control system determines which robotic devices to transmit instructions to depending on, for example, the location, availability, battery level, etc. of the robotic devices and the instruction requested by the application.

In some embodiments, the processor of the robotic refuse container generates a map of the environment. In some embodiments, a map of the environment is preloaded into a memory of the robotic refuse container. In some embodiments, the processor of the robotic refuse container generates a new map of the environment during each working session and combines it with previously generated maps to improve the accuracy of a complete map of the environment. In some embodiments, the processor of the robotic refuse container transmits one or more maps to a control system, such as the control system described above. In some embodiments, the control system updates a complete map of the environment with the maps received from the processor of the robotic refuse container. In some embodiments, the processor of the robotic refuse container transmits observations of the environment collected during working sessions to the control system. In some embodiments, the control system generates and updates a map of the environment using the observations received from the processor of the robotic refuse container. In some embodiments, processors of two or more robotic refuse containers collaborate together or with the control system to generate a map of the environment as described above. Examples of mapping methods are described in U.S. patent application Ser. Nos. 16/048,179, 16/048,185, 16/163,541, 16/163,562, 16/163,508, 16/185,000, 62/681,965, and 62/614,449, the entire contents of which are hereby incorporated by reference.

In embodiments, all or a portion of information transmitted by processors of robotic devices (such as those described herein) or a control system managing the robotic devices is stored in a centralized memory that can be accessed by the processors of the robotic devices or the control system managing the robotic devices. In some embodiments, information transmitted from the application of the communication device is stored in a centralized memory that can be accessed by the processors of the robotic devices or the control system managing the robotic devices. In some embodiments, the information transmitted and received between the control system, the processors of the robotic devices, and the application of the communication device include several different types of information, such as scheduling information, mapping information, navigation information, task information, status information, internal or external observations, and other types of information that are useful to the control system, the robotic devices, and a user of the application of the communication device.

In some embodiments, information is transmitted between robotic devices (e.g., control system, robotic refuse container, communication device, etc.) using a wireless communication channel such as Wi-Fi or Bluetooth.

In some embodiments, a schedule for refuse bag replacement for the robotic refuse container is determined by the processor of the robotic refuse container or a control system managing the robotic refuse container. In some embodiments, a schedule of a robotic refuse container includes at least one of: a day and time for refuse bag collection and replacement, a navigational route to a refuse bag collection location, a navigational route to a refuse bag replacement location, a navigational route to a storage location of unused refuse bags, a navigational route to a location after receiving a new refuse bag, etc. In some embodiments, the schedule of the robotic refuse container is determined in real-time. In some embodiments, the schedule of the robotic refuse container is determined based on an activity level surrounding the robotic refuse container, a number of operation hours of the robotic refuse container, a condition of the robotic refuse container, a status of the robotic refuse container, a number of maintenance hours of the robotic refuse container, environmental conditions (e.g., traffic conditions, weather conditions, etc.), etc. Examples of methods for setting a schedule are described in U.S. patent application Ser. Nos. 16/051,328 and 15/449,660, the entire contents of which are hereby incorporated by reference.

In some embodiments, the robotic refuse container includes, but is not limited to, a chassis, a set of wheels (if mobile for example), a suspension system, a rechargeable battery, an actuator, a control module, a processor, and a refuse container coupled to the chassis. An example of an autonomous refuse container is described in U.S. patent application Ser. No. 16/129,757, the entire contents of which is hereby incorporated by reference. In some embodiments, the chassis is a versatile mobile robotic chassis customized to function as a robotic refuse container. An example of a customizable versatile mobile robotic chassis is described in U.S. patent application Ser. No. 16/230,805, the entire contents of which is hereby incorporated by reference. Examples of wheels of a robotic device are described in U.S. Patent Application No. 62/664,389, Ser. Nos. 15/447,450, 15/447,623, and 62/665,942, the entire contents of which are hereby incorporated by reference. Examples of a suspension system are described in U.S. Patent Application Nos. 62/617,589, 62/620,352, and Ser. No. 15/951,096, the entire contents of which are hereby incorporated by reference. In some embodiments, the robotic refuse container further includes a user interface for, for example, adjusting settings, choosing functions, and scheduling tasks. In some embodiments, the robotic refuse container further includes a mapping module for mapping the environment using mapping methods such as those described in U.S. patent application Ser. Nos. 16/048,179, 16/048,185, 16/163,541, 16/163,562, 16/163,508, 16/185,000, 62/681,965, and 62/614,449, the entire contents of which are hereby incorporated by reference. In some embodiments, the robotic refuse container further includes a localization module that implements localization methods such as those described in U.S. Patent Application Nos. 62/746,688, 62/740,573, 62/740,580, Ser. Nos. 15/955,480, 15/425,130, and 15/955,344 the entire contents of which are hereby incorporated by reference. In some embodiments, the robotic refuse container further includes a path planning module to determine optimal movement paths based on the actions to be executed using path planning methods such as those described in U.S. patent application Ser. Nos. 16/041,286, 15/406,890, and 14/673,633, the entire contents of which are hereby incorporated by reference. In some embodiments, the robotic refuse container includes a scheduling module for setting a schedule using scheduling methods such as those described in U.S. patent application Ser. Nos. 16/051,328 and 15/449,660, the entire contents of which are hereby incorporated by reference. In some embodiments, the robotic refuse container includes sensors such as battery level sensors, weight sensors, refuse volume sensors, cameras, LIDAR sensors, LADAR sensors, stereo imaging sensors, optical sensors, imaging sensors, distance sensors, acoustic sensors, motion sensors, obstacle sensors, cliff sensors, floor sensors, debris sensors, time-of-flight sensors, depth sensors, signal transmitters and receivers, signal strength sensor, gyroscope, optical encoders, optical flow sensors, GPS sensors, and other types of sensors. In some embodiments, the robotic refuse container includes a wireless module to wirelessly send and receive information, such as a Wi-Fi module or a Bluetooth module.

FIG. 1 illustrates a flow chart including steps 100, 101, 102, 103, and 104 that describes some embodiments of a refuse bag replacement method.

Figure 2:
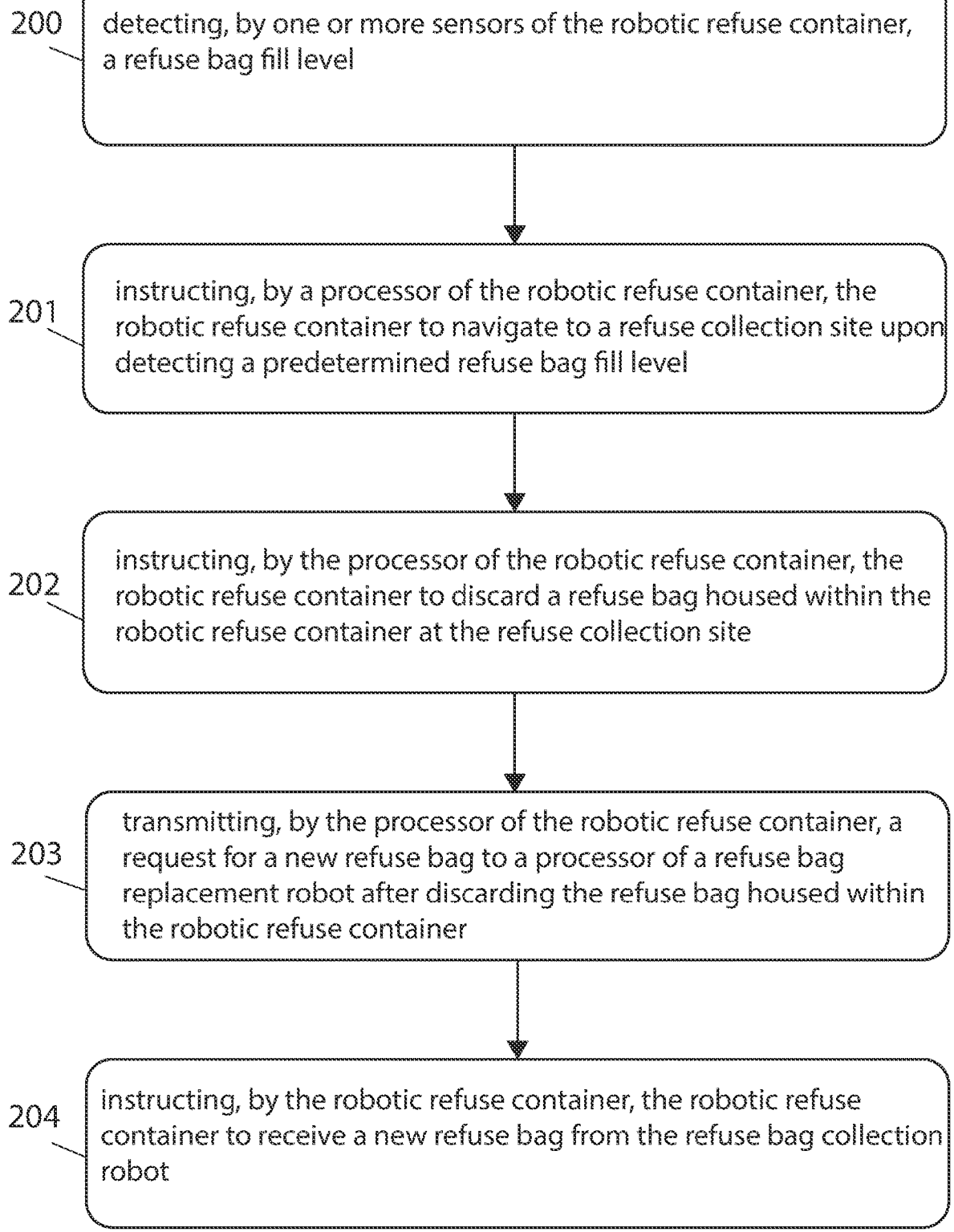
FIG. 2 illustrates a flow chart describing a refuse bag replacement method according to some embodiments.

FIG. 2 illustrates a flow chart including steps 200, 201, 202, 203, and 204 that describe some embodiments of a refuse bag replacement method.

Figure 3:
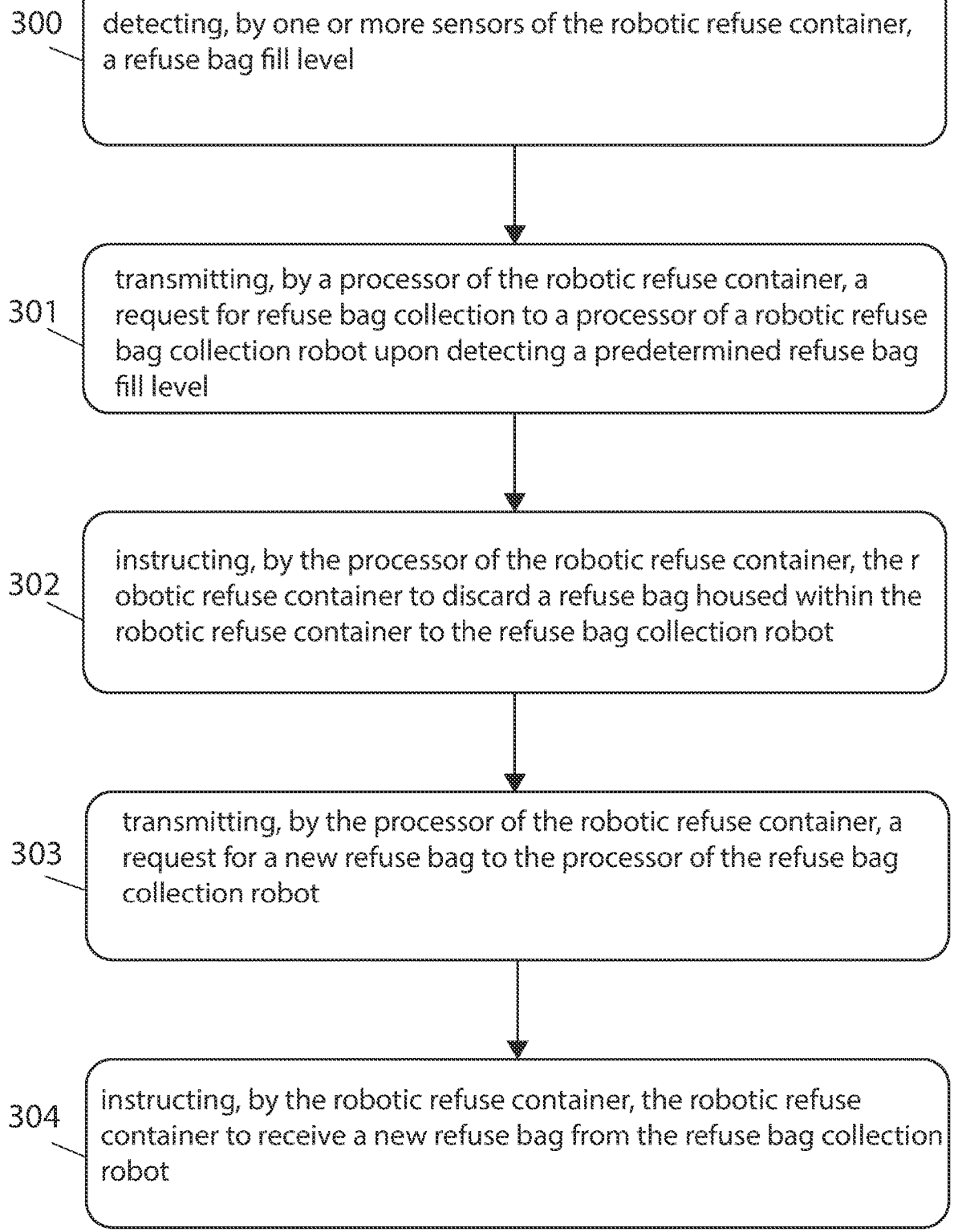
FIG. 3 illustrates a flow chart describing a refuse bag replacement method according to some embodiments.

FIG. 3 illustrates a flow chart including steps 300, 301, 302, 303, and 304 that describes some embodiments of a refuse bag replacement method.

Figure 4:
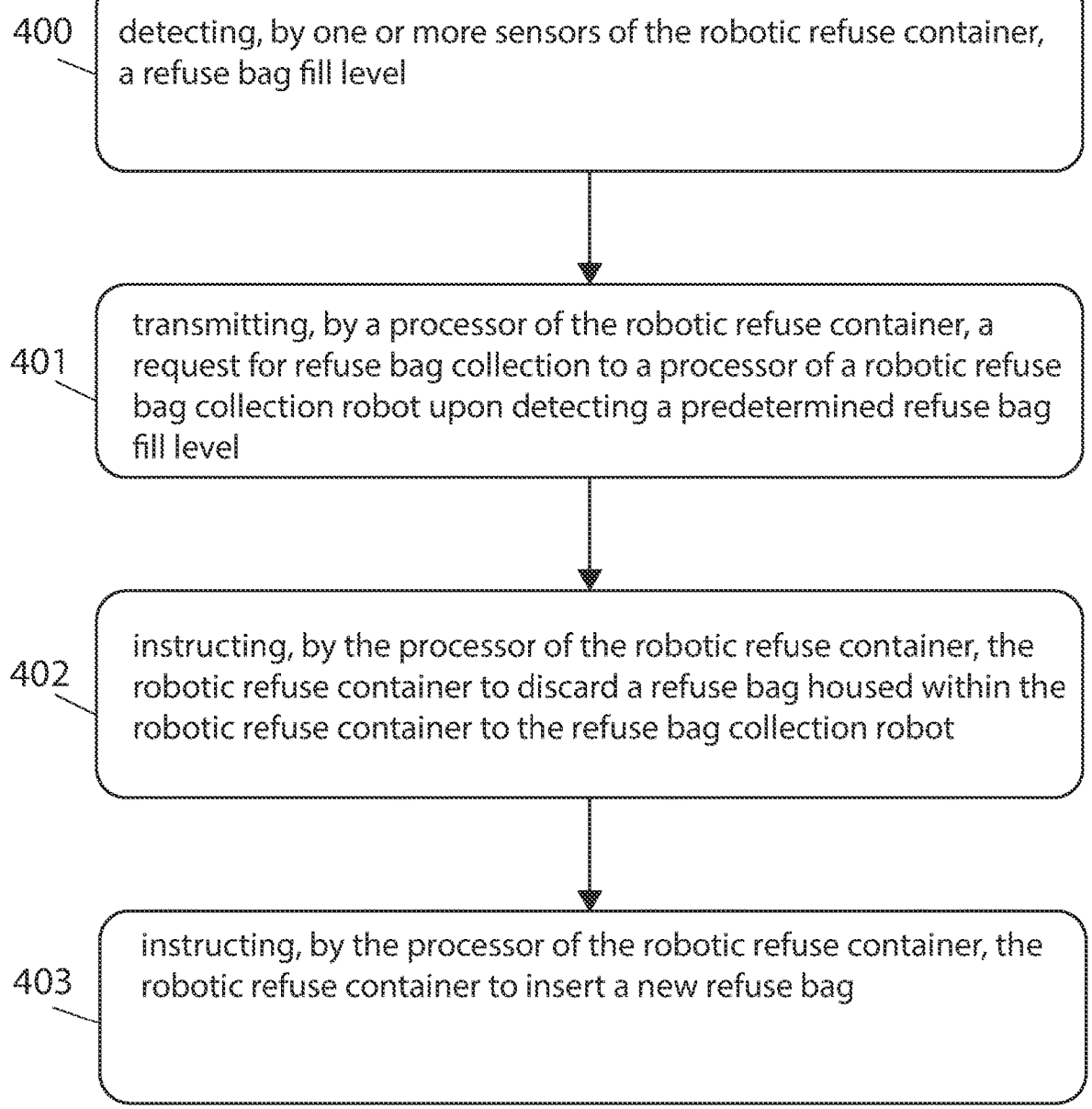
FIG. 4 illustrates a flow chart describing a refuse bag replacement method according to some embodiments.

FIG. 4 illustrates a flow chart including steps 400, 401, 402, and 403 that describe some embodiments of a refuse bag replacement method.

Figure 5:
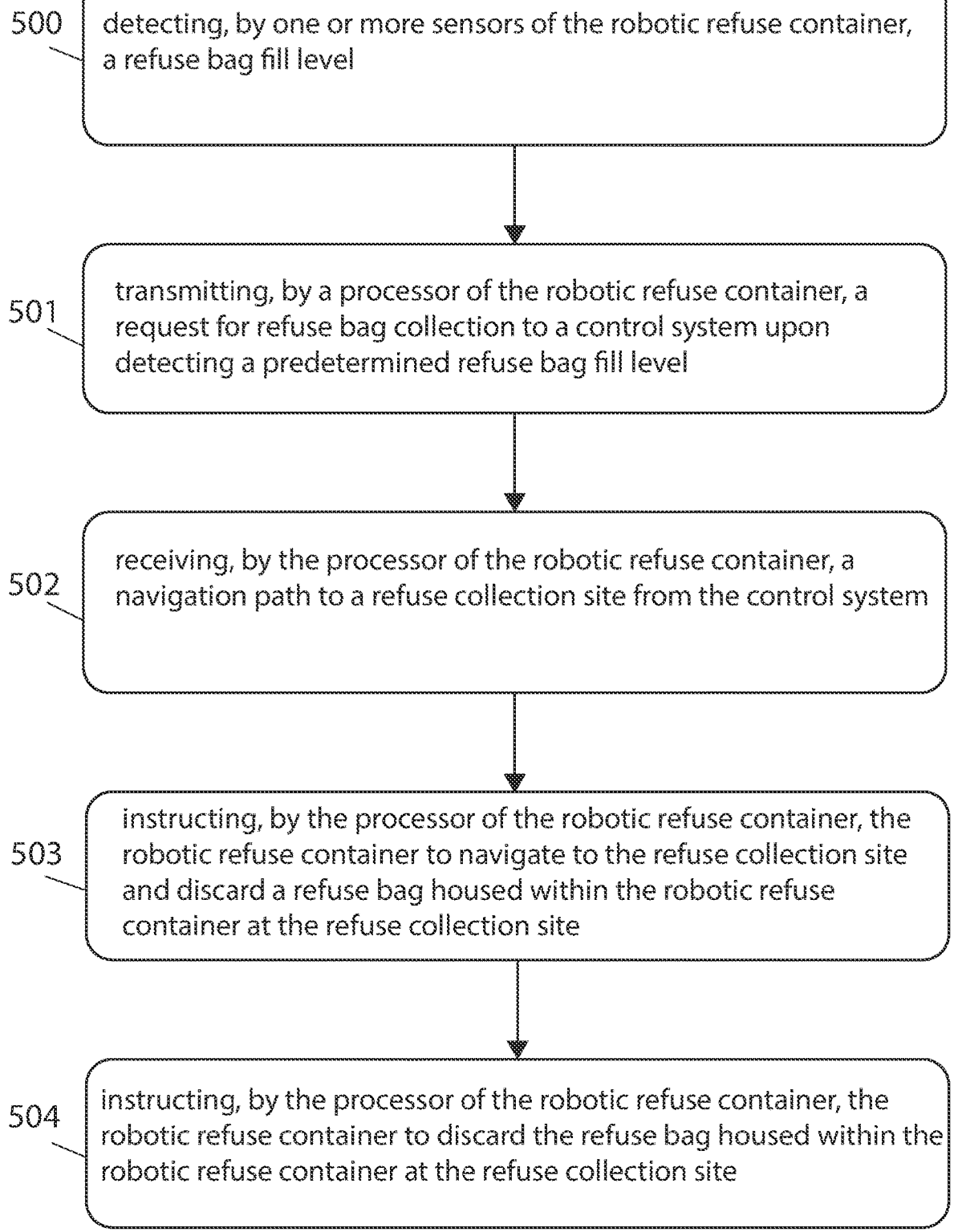
FIG. 5 illustrates a flow chart describing a refuse bag replacement method according to some embodiments.

FIG. 5 illustrates a flow chart including steps 500, 501, 502, 503, and 504 that describes some embodiments of a refuse bag replacement method.

Figure 6:
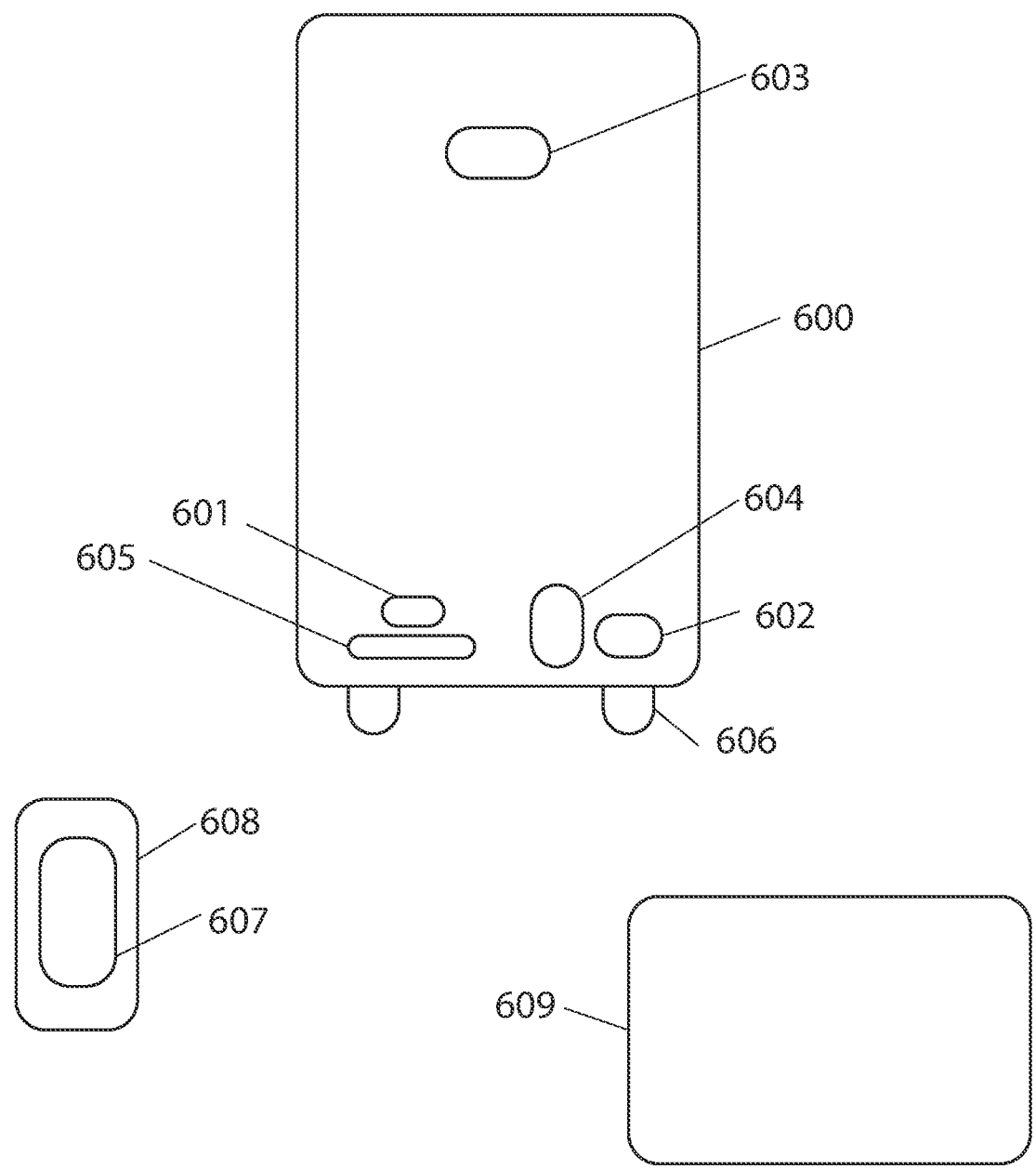
FIG. 6 illustrates an example of a robotic refuse container, an application of a communication device, and a control system according to some embodiments.

FIG. 6 illustrates a front view of an example of a robotic refuse container 600 with a processor 601, memory 602, sensors 603, actuator 604, battery 605 and wheels 606, within which a refuse bag is housed. In some embodiments, the robotic refuse container 600 may include the features of a robotic refuse container described herein. In some embodiments, program code stored in the memory 602 and executed by the processor 601 may effectuate the operations described herein. Some embodiments additionally include communication device 607 (e.g., mobile device, laptop, remote control, specialized computer, desktop computer, tablet, etc.) having a touchscreen 608 and that executes an application by which a user or operator interfaces with robotic refuse container 600. In some embodiments, processor 601 and memory 602 implement some of the functionality described herein. In some embodiments, the user or operator may provide instructions to robotic refuse container 600 or other robotic devices (such as those described herein) to perform certain tasks or to use certain settings at certain times or in certain areas of the environment using the application of communication device 607 wirelessly paired with robotic refuse container 600 or control system 609 managing robotic refuse container 600.

Various embodiments are described herein below, including methods and techniques. It should be kept in mind that the invention might also cover articles of manufacture that include a computer-readable medium on which computer-readable instructions for carrying out embodiments of the inventive technique are stored. The computer-readable medium may include semiconductor, magnetic, opto-magnetic, optical, or other forms of computer-readable medium for storing computer-readable code. Further, the invention may also cover apparatuses for practicing embodiments of the invention. Such apparatus may include circuits, dedicated and/or programmable, to carry out tasks pertaining to embodiments of the invention. Examples of such apparatus include a computer and/or a dedicated computing device when appropriately programmed and may include a combination of a computer/computing device and dedicated/programmable circuits adapted for the various tasks pertaining to embodiments of the invention.

In block diagrams provided herein, illustrated components are depicted as discrete functional blocks, but embodiments are not limited to systems in which the functionality described herein is organized as illustrated. The functionality provided by each of the components may be provided by software or hardware modules that are differently organized than is presently depicted. For example, such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, the applicant has grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The present techniques will be better understood with reference to the following enumerated embodiments:

1. A refuse bag replacement method comprising: detecting, by one or more sensors of the robotic refuse container, a refuse bag fill level; instructing, by a processor of the robotic refuse container, the robotic refuse container to navigate to a refuse collection site upon detecting a predetermined refuse bag fill level; and instructing, by the processor of the robotic refuse container, the robotic refuse container to discard a refuse bag housed within the robotic refuse container at the refuse collection site.

2. The refuse bag replacement method of embodiment 1, wherein the refuse collection site is a nearest refuse collection site or a refuse collection site that can be reached the fastest from a current location of the robotic refuse container.

3. The refuse bag replacement method of embodiments 1-2 further comprising: instructing, by the processor of the robotic refuse container, the robotic refuse container to insert a new refuse bag after discarding the refuse bag housed within the robotic refuse container; and instructing, by the processor of the robotic refuse container, the robotic refuse container to navigate to a particular location after receiving the new refuse bag.

4. The refuse bag replacement method of embodiment 3, wherein the robotic refuse container obtains the new refuse bag from a storage location housed within the robotic refuse container.

5. The refuse bag replacement method of embodiment 3, wherein the robotic refuse container obtains the new refuse bag from a storage location external to the robotic refuse container.

6. The refuse bag replacement method of embodiments 1-5 further comprising: transmitting, by the processor of the robotic refuse container, a request for a new refuse bag to a processor of a refuse bag replacement robot after discarding the refuse bag housed within the robotic refuse container; and instructing, by the robotic refuse container, the robotic refuse container to receive a new refuse bag from the refuse bag collection robot.

7. The refuse bag replacement method of embodiment 6, wherein the refuse bag replacement robot that receives the request for a new refuse bag is a nearest refuse bag replacement robot or a refuse bag replacement robot that can be accessed by the robotic refuse container the fastest.

8. The refuse bag replacement method of embodiment 6, wherein the robotic refuse container navigates to the refuse bag replacement robot prior to transmitting the request for a new refuse bag to the processor of the refuse bag replacement robot.

9. The refuse bag replacement method of embodiment 6, wherein the refuse bag replacement robot navigates to the robotic refuse container after receiving the request for a new refuse bag.

10. The refuse bag replacement method of embodiment 6, wherein the robotic refuse container navigates to a particular location after receiving the new refuse bag.

11. The refuse bag replacement method of embodiments 1-10, wherein the one or more sensors includes at least one of: an infrared transmitter and receiver and a weight sensor.

12. A refuse bag replacement method comprising: detecting, by one or more sensors of the robotic refuse container, a refuse bag fill level; and transmitting, by a processor of the robotic refuse container, a request for refuse bag collection to a processor of a robotic refuse bag collection robot upon detecting a predetermined refuse bag fill level.

13. The refuse bag replacement method of embodiment 12, wherein the refuse bag collection robot that receives the request for refuse bag collection is a nearest refuse bag collection robot or a refuse bag collection robot that can be accessed by the robotic refuse container the fastest.

14. The refuse bag replacement method of embodiments 12-13, wherein the refuse bag collection robot navigates to the robotic refuse container and collects a refuse bag housed within the robotic refuse container after the processor of the refuse bag collection robot receives the request for refuse bag collection.

15. The refuse bag replacement method of embodiment 14 further comprising: instructing, by the processor of the robotic refuse container, the robotic refuse container to discard a refuse bag housed within the robotic refuse container to the refuse bag collection robot; transmitting, by the processor of the robotic refuse container, a request for a new refuse bag to the processor of the refuse bag collection robot; and instructing, by the robotic refuse container, the robotic refuse container to receive a new refuse bag from the refuse bag collection robot.

16. The refuse bag replacement method of embodiment 14 further comprising: instructing, by the processor of the robotic refuse container, the robotic refuse container to discard a refuse bag housed within the robotic refuse container to the refuse bag collection robot; and instructing, by the processor of the robotic refuse container, the robotic refuse container to insert a new refuse bag.

17. The refuse bag replacement method of embodiments 12-16, wherein the robotic refuse container navigates to the refuse bag replacement robot prior to transmitting the request for a new refuse bag.

18. The refuse bag replacement method of embodiments 12-16, wherein the refuse bag replacement robot navigates to the robotic refuse container after receiving the request for a new refuse bag.

19. A refuse bag replacement method comprising: detecting, by one or more sensors of the robotic refuse container, a refuse bag fill level; and transmitting, by a processor of the robotic refuse container, a request for refuse bag collection to a control system upon detecting a predetermined refuse bag fill level.

20. The refuse bag replacement method of embodiment 19, wherein the control system transmits instructions to a processor of a refuse bag collection robot to navigate to the robotic refuse container, collect a refuse bag housed within the robotic refuse container, and insert a new refuse bag after receiving the request for refuse bag collection from the robotic refuse container.

21. The refuse bag replacement method of embodiments 19-20 further comprising: receiving, by the processor of the robotic refuse container, a navigation path to a refuse collection site from the control system; instructing, by the processor of the robotic refuse container, the robotic refuse container to navigate to the refuse collection site and discard a refuse bag housed within the robotic refuse container at the refuse collection site; and instructing, by the processor of the robotic refuse container, the robotic refuse container to discard the refuse bag housed within the robotic refuse container at the refuse collection site.

22. The refuse bag replacement method of embodiment 20 further comprising: transmitting, by the processor of the robotic refuse container, a request for a new refuse bag to the control system; and instructing, by the robotic refuse container, the robotic refuse container to receive a new refuse bag.

23. The refuse bag replacement method of embodiment 21, wherein the robotic refuse container receives the new refuse bag from the robotic refuse container.

24. The refuse bag replacement method of embodiment 21, wherein the control system transmits instructions to the processor of a refuse bag replacement robot to navigate to the robotic refuse container and insert a new refuse bag within the robotic refuse container after receiving the request for a new refuse bag.

25. The refuse bag replacement method of embodiment 21, wherein the control system transmits instructions to the processor of the robotic refuse container to navigate to a refuse bag replacement robot to receive a new refuse bag from the refuse bag replacement robot.

The invention claimed is:

1. A robotic refuse container, comprising:
    a chassis;
    a set of wheels coupled to the chassis;
    a refuse container coupled to the chassis for collecting refuse;
    a rechargeable battery;
    a plurality of sensors;
    a processor; and
    a tangible, non-transitory, machine-readable medium storing instructions that, when executed by the processor, effectuates operations comprising:
        detecting, with at least one sensor disposed on the robotic refuse container, an amount of refuse within the refuse container;
        instructing, with the processor, the robotic refuse container to navigate to a location to empty the refuse upon detecting the amount of refuse exceeds a predetermined refuse amount in the refuse container;
        emptying, by a separate device, the refuse within the refuse container at the location;
        autonomously choosing, by the processor, a schedule for emptying refuse from the refuse container; and
        determining, with the processor, the schedule based on a number of operational hours completed since the refuse was last emptied.

2. The robotic refuse container of claim 1, wherein the robotic refuse container is paired with an application of a communication device.

3. The robotic refuse container of claim 2, wherein:
the operations further comprise:
transmitting, with the processor, the amount of refuse within the refuse container, a battery level, a status of the robotic refuse container, and a current location of the robotic refuse container; and
the application is configured to:
display the amount of refuse within the refuse container, the battery level, the status of the robotic refuse container, and the current location of the robotic refuse container.

4. The robotic refuse container of claim 2, wherein the application is configured to:
receive at least one input designating an instruction for the robotic refuse container to navigate to the location to empty the refuse within the refuse container and a schedule for performing tasks; and
transmit the instruction and the schedule to the processor for execution.

5. The robotic refuse container of claim 2, wherein the application is configured to:
receive at least one input defining a movement path of the robotic refuse container; and
transmit an instruction to execute the movement path to the processor.

6. The robotic refuse container of claim 1, wherein the robotic refuse container navigates to a particular location after the refuse is emptied from the refuse container.

7. The robotic refuse container of claim 1, wherein the schedule is chosen based on an activity level within surroundings of the robotic refuse container.

8. The robotic refuse container of claim 1, wherein the operations further comprise:
generating, with the processor, a map of an environment of the robotic refuse container.

9. A robotic refuse container, comprising:
a chassis;
a set of wheels coupled to the chassis;
a refuse container coupled to the chassis for collecting refuse;
a rechargeable battery;
a plurality of sensors;
a processor; and
a tangible, non-transitory, machine-readable medium storing instructions that, when executed by the processor, effectuate operations comprising:
receiving, with the processor, an instruction to navigate the robotic refuse container to a location to empty the refuse within the refuse container;
instructing, with the processor, the robotic refuse container to navigate to the location to empty the refuse;
navigating, with the robotic refuse container, to the location;
emptying, by a separate device, the refuse within the refuse container at the location;
autonomously choosing, by the processor, a schedule for emptying refuse from the refuse container; and
determining, with the processor, the schedule based on a number of operational hours completed since the refuse was last emptied.

10. The robotic refuse container of claim 9, wherein the operations further comprise:
detecting, with at least one sensor disposed on the robotic refuse container, an amount of refuse within the refuse container;
instructing, with the processor, the robotic refuse container to navigate to the location to empty the refuse upon detecting the amount of refuse exceeds a predetermined refuse amount in the refuse container; and
emptying, by the separate device, the refuse within the refuse container at the location.

11. The robotic refuse container of claim 10, wherein the at least one sensor comprises an IR transmitter and receiver, wherein the amount of refuse exceeds the predetermined refuse amount in the refuse container when the IR receiver does not receive an IR signal from the IR transmitter for a predetermined amount of time.

12. The robotic refuse container of claim 9, wherein the robotic refuse container is paired with an application of a communication device.

13. The robotic refuse container of claim 12, wherein:
the operations further comprise:
transmitting, with the processor, an amount of refuse within the refuse container, a battery level, a status of the robotic refuse container, and a current location of the robotic refuse container; and
the application is configured to:
display the amount of refuse within the refuse container, the battery level, the status of the robotic refuse container, and the current location of the robotic refuse container.

14. The robotic refuse container of claim 12, wherein the application is configured to:
receive at least one input designating an instruction for the robotic refuse container to navigate to the location to empty the refuse within the refuse container and a schedule for performing tasks; and
transmit the instruction and the schedule to the processor for execution.

15. The robotic refuse container of claim 12, wherein the application is configured to:
receive at least one input defining a movement path of the robotic refuse container; and
transmit an instruction to execute the movement path to the processor.

16. The robotic refuse container of claim 9, wherein the robotic refuse container navigates to a particular location after the refuse is emptied from the refuse container.

17. The robotic refuse container of claim 9, wherein the schedule is chosen based on an activity level within surroundings of the robotic refuse container.

18. The robotic refuse container of claim 1, wherein the at least one sensor comprises an IR transmitter and receiver, wherein the amount of refuse exceeds a predetermined refuse amount in the refuse container when the IR receiver does not receive an IR signal from the IR transmitter for a predetermined amount of time.

* * * * *